July 6, 1937.     A. E. GRANT     2,086,220
ADJUSTABLE HAND STAMP
Filed July 18, 1936

ALBERT E. GRANT
INVENTOR.

BY John P. Nikonow
ATTORNEY

Patented July 6, 1937

2,086,220

UNITED STATES PATENT OFFICE 2,086,220

ADJUSTABLE HAND STAMP

Albert E. Grant, New York, N. Y., assignor to Henry S. Otto, Scarsdale, N. Y.

Application July 18, 1936, Serial No. 91,310

5 Claims. (Cl. 101—111)

The present invention relates to adjustable hand stamps of the kind used for dating and other purposes. These stamps are provided with endless rubber belts or bands carrying characters for printing. Each belt passes over a fixed support at one end and a movable pulley on the other. The belts are rotated manually to bring the desired characters into printing position by means of notched wheels protruding through the housing. One of the objects of this invention is to provide a hand stamp which will comprise a novel casing to shelter the stamp printing mechanism and which casing will incorporate certain practical points and novel features in relation to its conveniences when using and operating the same and to its structural design to protect delicate elements forming part of this stamp.

Another object is to provide this casing with novel means to rigidly maintain the casing with its printing arrangement in a securely assembled condition.

These and other objects, to be referred to in the following, I attain by the mechanism shown in the accompanying drawing, and in which—

Figure 1:
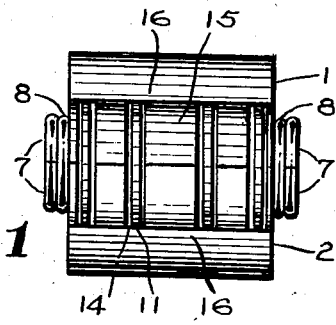
Fig. 1 is a plan view of the hand stamp.
Figure 2:
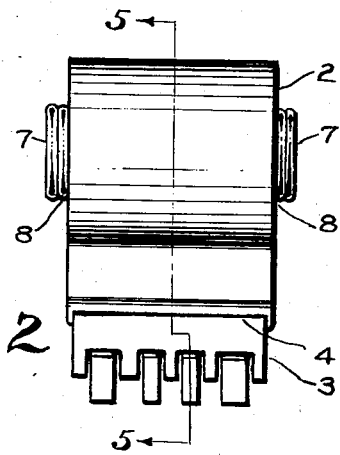
Fig. 2 is a front elevation of the same.
Figure 3:
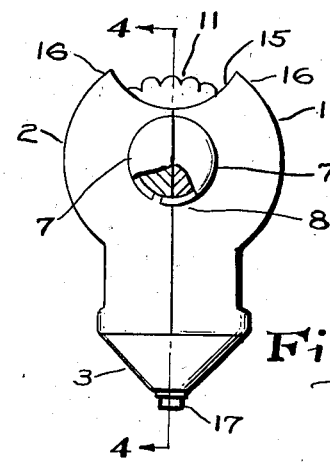
Fig. 3 is a side elevation of the same.
Figure 4:
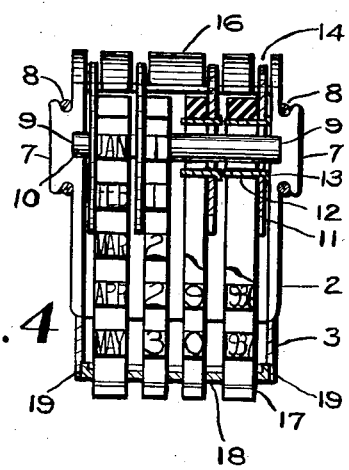
Fig. 4 is a sectional view taken on the line 4—4 of Fig. 3.
Figure 5:
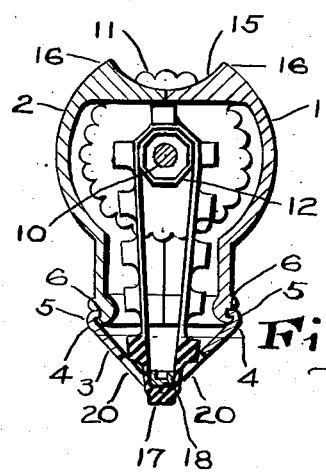
Fig. 5 is a sectional view taken on the line 5—5 of Fig. 2.

The housing of my hand stamp comprises three main parts, of which two are identical, being denoted by numbers 1 and 2 on the drawing, and they will be referred to as casing halves or shells. The third part is a V-shaped support shell 3, located at the lower ends of the casing halves and holding these halves together.

The long upper edges 4 of the shell 3 are provided with suitable lips 5 engaging grooves 6 correspondingly located in the lower extremity of the casing halves 1 and 2. A slight pressure exerted against the sides of the shells 1 and 2 at points above the groove 6 will deflect the sides inwardly so as to release them from the part 3, when assembling the device or taking it apart.

Each of the halves 1 and 2 is provided with semi-circular knobs 7 located near the top and at the outside of the housing walls. When the two shells are in an assembled position, the half-round knobs of each shell mate with those of the other shell, thereby forming a full circular knob on either side of the housing. These knobs are provided with grooves adapted to retain circular rings 8 for the purpose of keeping the two shells assembled.

At substantially the same location of the knobs 7, but on the inner walls of the shells 1 and 2, are provided semi-circular holes 9 for the ends of a shaft or cylinder 10 within the casing. On this shaft is mounted a series of disc wheels 11 provided with pulleys 12. These pulleys represent octagonal hubs, having the alternating sides protruding through slots 13 in the disc wheels 11.

The disc wheels 11 are substantially enclosed entirely in the casing but pass, however, through suitable slots 14, protruding slightly above the curved top surface 15 of the casing. This surface provides prominences or raised portions 16, protecting the extended parts of the wheels and permitting the operator to press on the casing while printing, without touching the edges of these wheels.

The endless belts 17 are supported on the pulleys 12 and are stretched over a supporting bar 18 in the lower portion of the housing. The bar 18 is held in its place by its bent-over ends fitting in notches 19 of the shell 3. Slots or openings 20 are provided in the shell 3 for the belts.

My adjustable hand stamp provides an arrangement which is quite simple in its design and easy to manufacture and assemble. The novel design of the housing permits the operator to hold the stamp with the fingers of both hands so as to accurately place the character line in the exact location on which the printing is to be done.

It is understood that my adjustable hand stamp may be modified in its practical embodiments without departing from the spirit of my invention as set forth in the appended claims.

I claim as my invention:

1. An adjustable hand stamp comprising a housing formed of two symmetrical portions, half-round projections on the abutting sides forming complete circles when the halves are fitted together, resilient members detachably joining the half-round projections, a shaft supported by its ends in mutually registering recesses in the two halves, belts with raised characters rotatively supported on the shaft, and means to stretch the belts exposing one character on each belt for printing purposes, the housing being of a substantially rounded shape and adapted to be held in an operator's hand.

2. An adjustable hand stamp comprising a housing formed of two symmetrical halves, projections on the abutting portions of the halves, means adapted to engage the projections for detachably connecting the halves together, a shaft in the housing, discs with pulleys rotatively supported on the shaft, a tapering shell removably attached to one end of the housing, a bar in the shell, belts with raised characters stretched over the pulleys and the bar, the shell having slots for the belts so as to expose characters on the belts in operative positions, the belts being adapted to be adjusted by manually turning the discs, the housing being substantially rounded and adapted to be held in an operator's hand, the housing having a groove in its end opposite the shell with slots for the discs thereby rendering the discs accessible for manual turning.

3. An adjustable hand stamp comprising a housing formed of two halves, semicircular projections on the abutting portions of the halves forming circular projections when the halves are placed together, resilient split rings holding the halves together, a shaft in the housing, pulleys rotatively mounted on the shaft, printing belts on the pulleys, means to expose in an operative position one character at a time on each belt, means on the pulleys for manually turning them, the housing having slots for the pulley turning means.

4. An adjustable hand stamp comprising a housing formed of hollow parts detachably joined together, a shaft in the upper portions of the housing, pulleys rotatively supported on the shaft, belts with raised characters on the pulleys, a supporting bar at the lower end of the stamp for the belts, and disc wheels of a relatively larger diameter attached to pulleys, the housing being of a substantially rounded shape enclosing the wheels and forming thereby a handle for the stamp, the housing having on top a longitudinal depression between the rounded sides, the depressed portion having slots for exposing portions of the wheels on top of the housing.

5. An adjustable hand stamp comprising a housing formed of hollow parts detachably joined together, a shaft in the upper portion of the housing, disc wheels rotatively mounted on the shaft, polygonal pulleys with alternate sides protruding through slots in the disc wheels thereby joining the pulleys with the respective wheels, a bar at the lower end of the stamp, belts with raised characters supported on the pulleys and on the bar, the housing being rounded in the upper portion around the wheels thereby forming a handle, and being provided with a longitudinal depression on top with slots for exposing portions of the wheels.

ALBERT E. GRANT.